(12) United States Patent
Afferton (10) Patent No.: US 7,167,444 B1
(45) Date of Patent: Jan. 23, 2007

(54) FAMILY RING PROTECTION TECHNIQUE

(75) Inventor: Thomas S Afferton, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/473,953

(22) Filed: Dec. 29, 1999

(51) Int. Cl.
*H04L 12/26* (2006.01)

(52) U.S. Cl. ...................... 370/222; 370/228
(58) Field of Classification Search ................ 370/222, 370/223, 224, 228
See application file for complete search history.

(56) References Cited

U.S. PATENT DOCUMENTS

| | | | | |
|---|---|---|---|---|
| 4,835,763 A | * | 5/1989 | Lau ............................. | 370/223 |
| 5,093,824 A | * | 3/1992 | Coan et al. .................. | 370/228 |
| 5,406,401 A | | 4/1995 | Kremer ........................ | 359/110 |
| 5,406,549 A | * | 4/1995 | Kremer ........................ | 370/224 |
| 5,442,620 A | | 8/1995 | Kremer ........................ | 370/224 |
| 5,444,693 A | | 8/1995 | Arslan et al. ................ | 370/221 |
| 5,475,676 A | * | 12/1995 | Takatori et al. ............. | 370/217 |
| 5,974,027 A | * | 10/1999 | Chapman ..................... | 370/228 |
| 5,982,517 A | * | 11/1999 | Fishman ....................... | 370/222 |
| 6,295,146 B1 | * | 9/2001 | Nathan et al. ............... | 370/222 |
| 6,301,254 B1 | * | 10/2001 | Chan et al. .................. | 370/397 |
| 6,396,852 B1 | * | 5/2002 | Simmons ..................... | 370/224 |
| 6,430,151 B1 | * | 8/2002 | Glas et al. ................... | 370/222 |

* cited by examiner

*Primary Examiner*—Chi Pham
*Assistant Examiner*—Keith M. George
(74) *Attorney, Agent, or Firm*—Michael Haynes PLC (57) ABSTRACT

A method for structuring SONET rings in a network is disclosed, along with a method for redirecting traffic among SONET rings when a fault causing traffic outage on a single SONET ring is detected. First, SONET rings are structured into "families" sharing common offices, with each family containing an additional "protection ring". When a service-affecting alarm is detected in a SONET ring, it is determined whether there are any service alarms on a protection ring in the SONET ring family. It is also determined whether or not the protection ring is already in use. If the protection ring is not in use and no alarms are detected in the protection ring, the protection ring is marked as being in use. Traffic from the ring in which the service alarm is detected is then re-routed onto the protection ring. A method is also given for directing traffic back to the original SONET ring after the failure is repaired.

4 Claims, 6 Drawing Sheets

| SERVICE-AFFECTING LINE-LEVEL ALARMS – EQUIPMENT |
|---|
| UNIT FAIL |
| IMPROPER REMOVAL |
| LINE LEVEL ALARMS |
| SERVICE-AFFECTING LINE-LEVEL ALARMS – FACILITY |
| LINE AIS |
| B2 SIGNAL DEGRADE |
| LOF |
| LOS |
| OPTICAL OUTPUT FAILURE |
| RFI |
| SPAN SWITCH FAIL |

FAMILY RING PROTECTION TECHNIQUE

FIELD OF THE INVENTION

The invention relates to a method and system for backing up secondary failures on SONET rings using capacity of other rings in the same ring family. This method is proposed as an alternative to complex dynamic restoration schemes that require costly development. This method could be presented to vendors, in total, for implementation on vendor-provided element management systems.

BACKGROUND OF THE INVENTION

SONET rings have become the standard for providing fast restoration capabilities in the high-capacity transport networks. Robust operation and millisecond restoration times are achieved in SONET rings by having a single predefined restoration line, that being the protection lines around the side of the ring opposite the failure. One disadvantage, however, of a single restoration line is that traffic is vulnerable to secondary failures that take down or preempt the restoration line.

Analysis has shown that secondary failures are rare on any given ring. Because of this, even if the recovery from secondary failures is assumed to require physical repair that takes hours to complete, the contribution to average unavailability of circuits routed over a given SONET ring is negligible. However, given the large quantities of SONET rings being deployed in major carrier networks, the probability of secondary failures causing ring traffic to be dropped somewhere in the network becomes appreciable. Further, customer perceptions of reliability are often based more on memory of a single extended outage rather than on long term average performance. Thus, there is potential value in having the ability to quickly recover traffic dropped because of secondary failures on rings and thereby avoid embarrassing extended outages.

Digital cross-connected automated restoration schemes, which also provide primary restoration for mesh facilities, have been proposed as a means for recovering failed ring traffic as a result of secondary failures. This scheme is particularly attractive given the trend toward integration of add/drop multiplexer capabilities into digital cross-connects. The basic approach of these schemes is to use a centralized processor to collect alarms, to survey the state of failed facilities and then find alternate routes for the failed traffic over spare or protection capacity elsewhere in the network. The centralized processor instructs the digital cross-connects to reroute the traffic.

A significant disadvantage of dynamic restoration schemes is that proprietary systems must be developed to collect alarms and facility information, plan restoration capacity, calculate alternate routes and issue cross-connect commands. The cost associated with this development would be particularly difficult to justify for a ring-only network where the systems only support recovery of rare secondary failures.

Another issue with a back-up scheme that involves finding spare capacity in real time is that perceived benefit of sharing protection capacity with other rings may not be realized in a sparsely connected network. Consider, for example, an office with only two fiber routes out of the office, with two or more rings having terminal nodes in that office. A likely cause of a secondary failure would be a fiber cut, which would effect all the rings, and then a circuit pack failure that would effect a single ring. The traffic dropped from the ring with the secondary failure could not be recovered using protection capacity on the other co-terminous rings because the protection capacity of the other rings would be in use for ring switching in response to the fiber cut. Thus, the only way to recover the dropped traffic using the other co-terminous rings would be to use service capacity on the other rings. Planning, administration and monitoring dedicated service capacity across a ring network to protect against the variety of possible second order failures would be complex and costly.

SUMMARY OF THE INVENTION

It is an object of the present invention to provide a method and system and corresponding network topology for backing up secondary failures on SONET rings which overcomes the problems cited above.

According to one of the embodiments of the present invention, a method for structuring SONET rings in a network is disclosed, along with a method for redirecting traffic among SONET rings when a fault causing traffic outage on a single SONET ring is detected. First, SONET rings are structured into "families" sharing common offices, with each family containing an additional "protection ring". When a service-affecting alarm is detected in a SONET ring, it is determined whether there are any service alarms on a protection ring in the SONET ring family. It is also determined whether or not the protection ring is already in use. If the protection ring is not in use and no alarms are detected in the protection ring, the protection ring is marked as being in use. Traffic from the ring in which the service alarm is detected is then re-routed onto the protection ring. A method is also given for directing traffic back to the original SONET ring after the failure is repaired.

According to another embodiment of the present invention, a method structuring SONET rings in a network is disclosed, along with a method for redirecting traffic among SONET rings in a SONET ring family when a fault affecting multiple SONET rings is detected. First, SONET rings are structured into "families" sharing common offices, with each family containing an additional "protection ring". Second, the protection ring is configured in such a way that it will not fail in the same way as other SONET rings in the SONET ring family. Third, a high priority ring from the ring family is identified, as traffic from only one SONET ring can be protected. When a service-effecting alarm is detected in the priority SONET ring in the SONET ring family, it is determined from which span in the SONET ring the service alarm was detected. It is then determined whether there are any service alarms in a span of a protection ring which corresponds to the failed span in the SONET ring. Then, it is determined whether the protection ring is in use for protection. If the only alarms detected on the protection ring correspond the failed span in the SONET ring then the protection ring is marked as being in use. Traffic from the failed span is then redirected onto the span in the protection ring around the opposite side of the ring from those that correspond to the failed span on the service SONET ring.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

Figure 1:
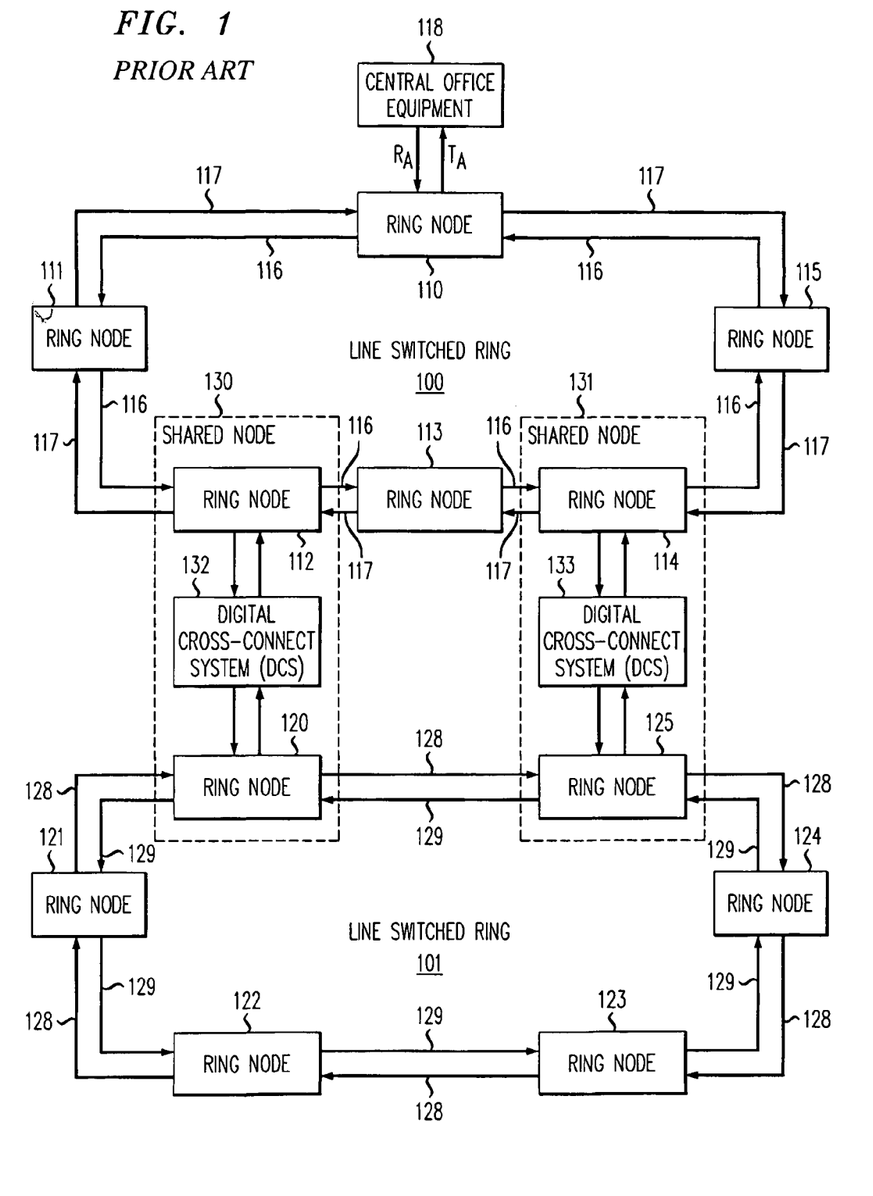
FIG. 1 illustrates the prior art SONET ring.

FIG. 1 shows, in simplified form, a line switch ring transmission system 100 interworking with another line switch ring transmission system 101. In this example, the line switch ring 100 includes ring nodes 110 through 115 and the other line switch ring 101 includes ring nodes 120 through 125. Ring nodes 112 and 120 form first shared node 130 for interworking communication circuits between the line switch rings 100 and the line switch ring 101. Similarly, the ring nodes 114 and 125 form an additional shared node 131 for interworking communication circuits between the line switch ring 100 and the line switch ring 101. In this example, ring nodes 112 and 120 in shared node 130 are shown as being interconnected by inter-ring grooming apparatus, namely, digital cross-connect system (DCS) 132. Similarly, ring nodes 114 and 125 in shared node 131 are shown as being interconnected by inter-ring grooming apparatus, namely, digital cross-connect system (DCS) 133. Both DCS 132 and DCS 133 are so called broadband cross-connect systems of a type known in the art and described in the technical reference entitled "Wideband and Broadband Digital Cross-Connect Systems Generic Requirements and Objectives", PR-TSY-000233, Issue 2, September 1989, Bell Communications Research. It will be apparent that other broadband grooming apparatus may be equally employed to realize the inter-ring grooming of communications circuits.

Ring nodes 110 to 115 are interconnected by transmission line 116 in a counter-clockwise direction and by a transmission line 117 in a clock-wise direction to form the line switch ring 100. In this example, the transmission lines 116 and 117 are comprised of optical fibers and, typically, each is comprised of a single optical fiber. Such line-switched ring transmission systems are known. Similarly, ring nodes 120–125 are inter-connected by transmission line 128 and by transmission line 129 to form line switch ring 101. In this example, transmission data signals in the SONET digital signal format is assured. However, it will be apparent that the invention is equally applicable to other digital signal formats, for example, the CCITT synchronous digital hierarchy (SDH) digital signal formats. In this example, it is assumed that an optical OC-N SONET digital signal format is being utilized for transmission of a transmission line 116 and 117 in the line switch ring 100 and a similar or other digital signal over transmission line 128 in the line switch ring 101.

Each of the ring nodes 110 through 115 and 120 through 125 comprise an add-drop multiplexer (ADM). Such add-drop multiplexer arrangements are well known. For generic requirements with a SONET based ADM see the technical reference entitled "SONET Add-Drop Multiplex Equipment (SONET ADM) Generic Criteria", PR-TSY-000496, Issue 2, September 1989, Supplement 1, September 1991, Bell Communications Research. In this example, the ADM operates to pass signals through the ring node, to add signals to the ring node and to drop signals at the ring node.

Figure 2:
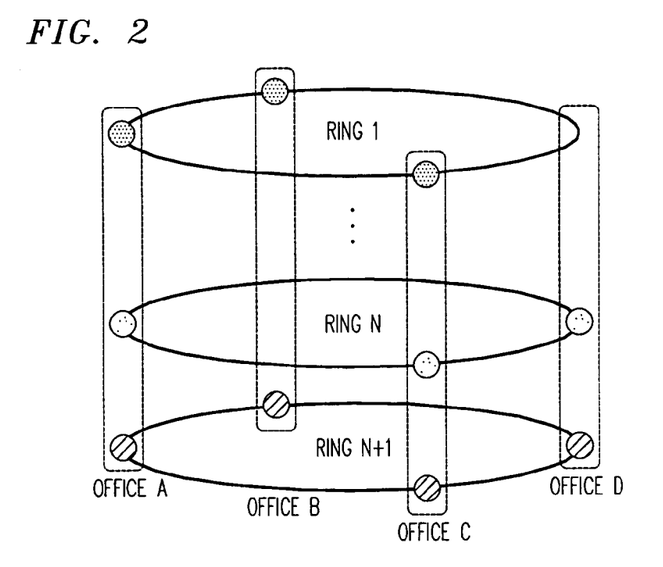
FIG. 2 illustrates a SONET ring family according to one embodiment of the present invention.

According to one embodiment of the present invention, a method for structuring SONET rings in a network is disclosed, along with a method for redirecting traffic among SONET rings when a fault causing traffic outage on a single SONET ring is detected. According to this embodiment, an extra ring is added to a collection of SONET rings sharing common offices, henceforth referred to as a ring family, and acts as a protection ring. As illustrated in FIG. 2, the ring family consists of rings 1 through N. Ring N+1 is added to the family of rings to act as the protection ring.

In this embodiment, a ring family is defined as a set of rings that share the same fiber sheath particularly and possibly the same dense wavelength division multiplexed optical transport systems on each span around the rings. Not all of the rings in the ring family must have the same number of nodes or have nodes in the same offices, but the N+1 protection ring must have nodes in all the nodes served by any of the other rings in the ring family.

The technology used in this embodiment is one of a new generation of digital cross-connects that integrate DCS tributary cross-connect capabilities with SONET ring add-drop multiplexer capabilities. As such, traffic can be routed between coterminous nodes from different rings on a ring family using the fabric of the cross-connects. In this embodiment, the algorithm for re-routing traffic can be implemented in the digital cross-connects themselves or the Element Management Systems that control them. 1×N ring restoration can also be implemented in networks where SONET ring add/drop multiplexers are not integrated with digital cross-connects, however in such cases the algorithm for re-directing traffic would be implemented in the Network Management Systems that separately controlled both the SONET ring add/drop multiplexers and the digital cross-connects.

The failure modes detected are double failures like a fiber cut followed by an equipment failure such that the secondary failure only affects one ring in the ring family. The capacity of the ring N+1 can be used for delivering lower priority traffic with the understanding that it is protected against single equipment failures, restorable against fiber failures, but preemptable if a secondary failure drops traffic on one of the other end rings. The managing system, commonly referred to as an Element Management System, has knowledge about how the network elements are configured into SONET rings. When rings are configured, the managing system has the capability to associate ring subnetworks as part of a ring family.

Figure 3:
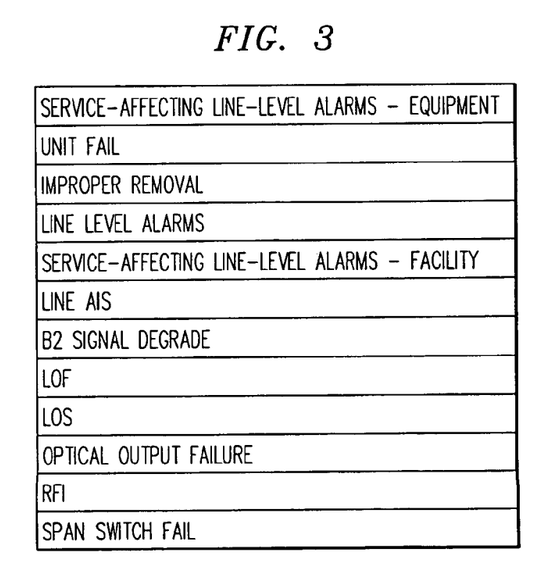
FIG. 3 is a table illustrating possible service alarms.

According to one embodiment of the present invention, the basic approach of 1×N ring family protection is to monitor for service-affecting line-level alarms for the ring family. As illustrated in FIG. 3, service affecting line level alarms for equipment can be, for example: unit fail; improper removal; and line level alarms. Service affecting line level alarms for facilities are, for example, line AIS, B2 Signal Degrade, Loss of Frame (LOF), Loss of Signal (LOS), Optical Output Failure, Return Fault Indicator (RFI) and Span Switch Failure. In general, service-affecting alarms indicate that a fault has occurred such that traffic cannot be recovered based on inherent SONET linear and ring protection capabilities. If a service-affecting alarm is detected on only one ring node, then the traffic routed over the failed span of the affected ring is redirected over the parallel span on the N+1 protection ring. Traffic is redirected on the protection ring around only the failed span to minimize the amount of traffic preempted on the protection ring.

According to a first embodiment of the invention, the 1×N ring family restoration occurs when there has been a first failure which affects all of the rings in the ring family and a secondary failure that affects only one of the rings.

Figure 4A:
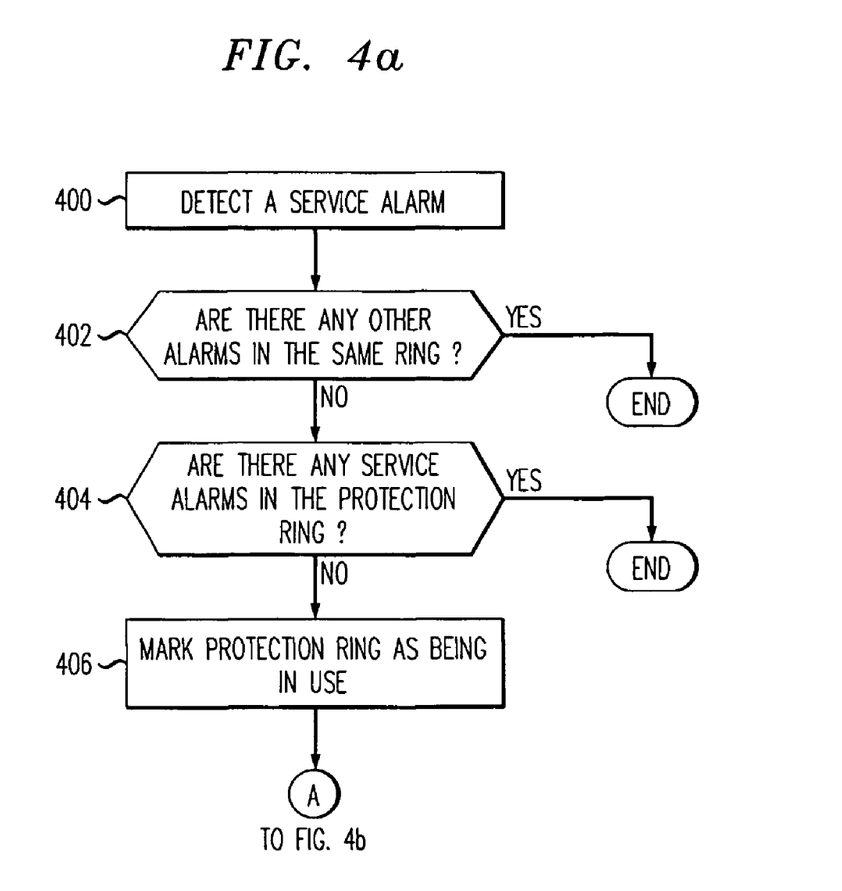
FIGS. 4(a)–(b) are flowcharts describing the operation of one embodiment of the present invention, including how to redirect traffic.
Figure 4B:
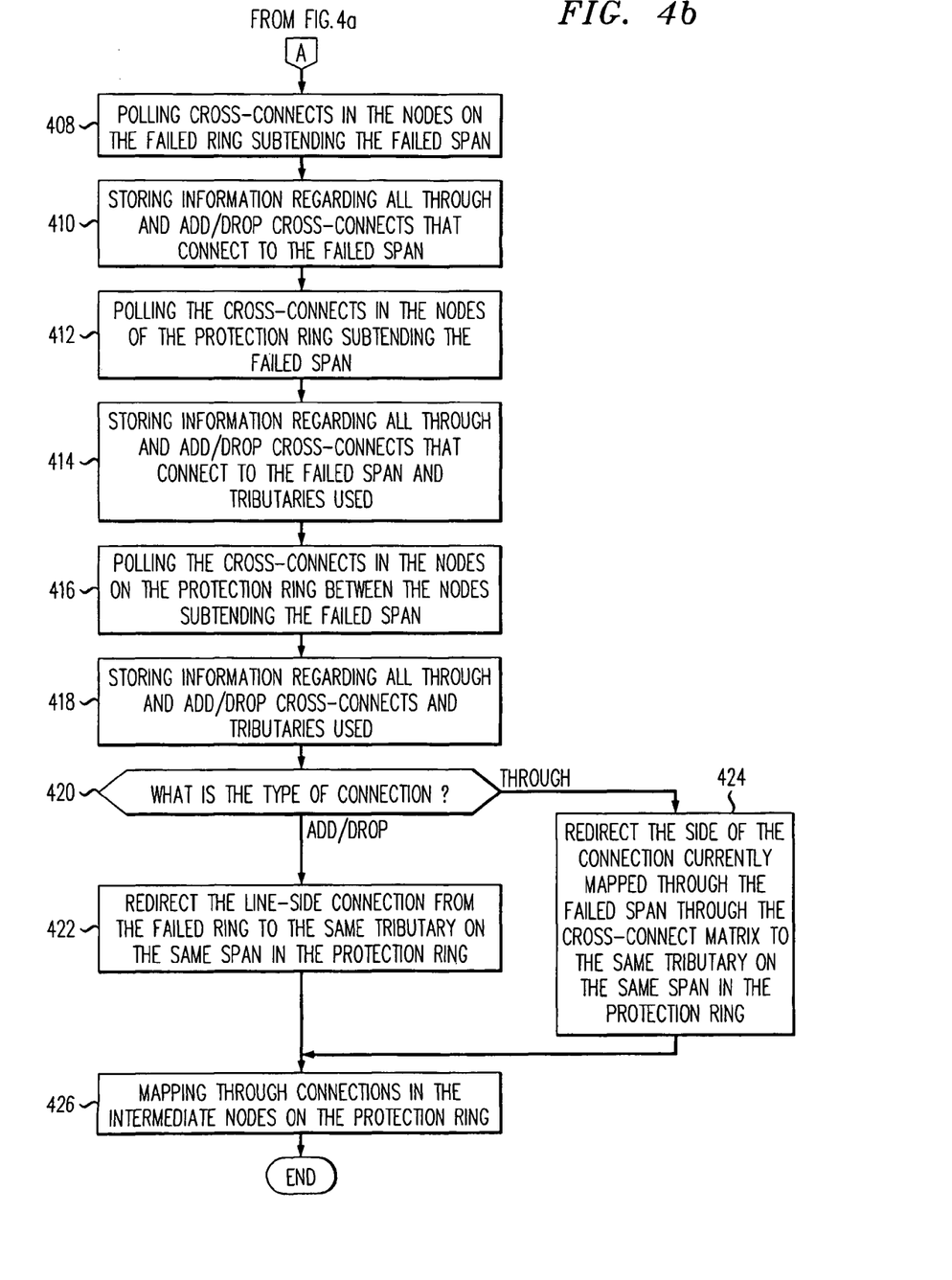

FIGS. 4a–b illustrates one embodiment for implementation of the invention. If a service-affecting line level alarm is detected in step 400, a search for other service-affecting line level alarms in the same ring is performed in step 402. If there are no service-affecting line level alarms on other spans in the same ring during a first time interval $t_{WAIT1}$, where $t_{WAIT1}$ is provisionable perhaps on a order of seconds, a search for service-affecting line level alarms on the protection ring is performed in step 404. If there are no service-affecting alarms on the protection ring during a time $t_{WAIT2}$, where $t_{WAIT2}$ is provisionable in the order of seconds, and the system proceeds with a 1×N reroute. The protection ring is also marked as being in use in step 406 to prevent other rings from attempting to make us of the protection ring during subsequent failures. The cross-connects in the nodes on the failed ring subtending the failed span are polled in step 408. All through and add/drop cross-connects that connect to the failed span are then noted and stored in step 410. The cross-connects in the nodes on the protection ring subtending the spans or spans that parallel the failed span on the failed service ring are then polled in step 412. All protection ring through and add/drop cross-connects that connect to the span that parallels the failed service span and make use of tributaries used in the cross connections noted in step 410 are noted in step 414. The cross-connects in the nodes on the protection ring between those polled in step 412 are then polled in step 416. All through and add/drop cross-connects that make use of tributaries used in the cross-connections noted in step 414 are then noted in step 418.

The system, in step 420, then sorts through the cross-connect list from the nodes on the failed ring gathered in step 410. For each add/drop connection, the line-side connection from the failed ring is then redirected to the same tributary on the same span in the protection ring in step 422. For each through connection, the side of the connection currently mapped through the failed span is rerouted through the cross-connect matrix to the same tributary on the same span in the protection ring in step 424. For each tributary noted in step 414, through connections in the intermediate nodes, if any, are mapped onto the protection ring in step 426.

After the failures have been repaired and verified, the facilities are bridged and rolled from the protection ring back to the original cross-connect locations on the repair ring, using the table of original cross-connects stored in step 410 for the affected span prior to the restoration. Finally, the cross-connects on the protection ring are restored using the tables stored in steps 412 and 414.

According to a second embodiment of the invention, the 1×N ring family restoration can occur when there has been a first failure that effects all of the rings in the ring family and a secondary failure that also effects all of the rings in the ring family. For example, a common secondary failure mode that could affect all of the rings in a ring family is an optical amplifier in a dense-wavelength division multiplexed optical transport system. In this embodiment, the protection ring will only be able to handle a portion of all of the traffic on the other rings. As a result, it is predefined which rings have priority over the other rings in the ring family. Thus, the traffic on the rings with the highest priority will be handled by the protection ring while traffic on the lower priority rings will be lost if the protection ring is being used for the rings with the highest priority.

In this second embodiment of the invention, the service and protection lines on the SONET rings are connected to separate optical transport system lines. The assignment of services and protection lines for the protection ring is opposite that of the service rings in the SONET ring family. For example, if the service lines on the N service rings are connected to optical transport system line 1, then the service line of the N+1 protection would be connected to optical transport system line 2.

This reversal of line assignments means that the protection ring service line is not vulnerable to the same failure modes as the N service rings.

Figure 5A:
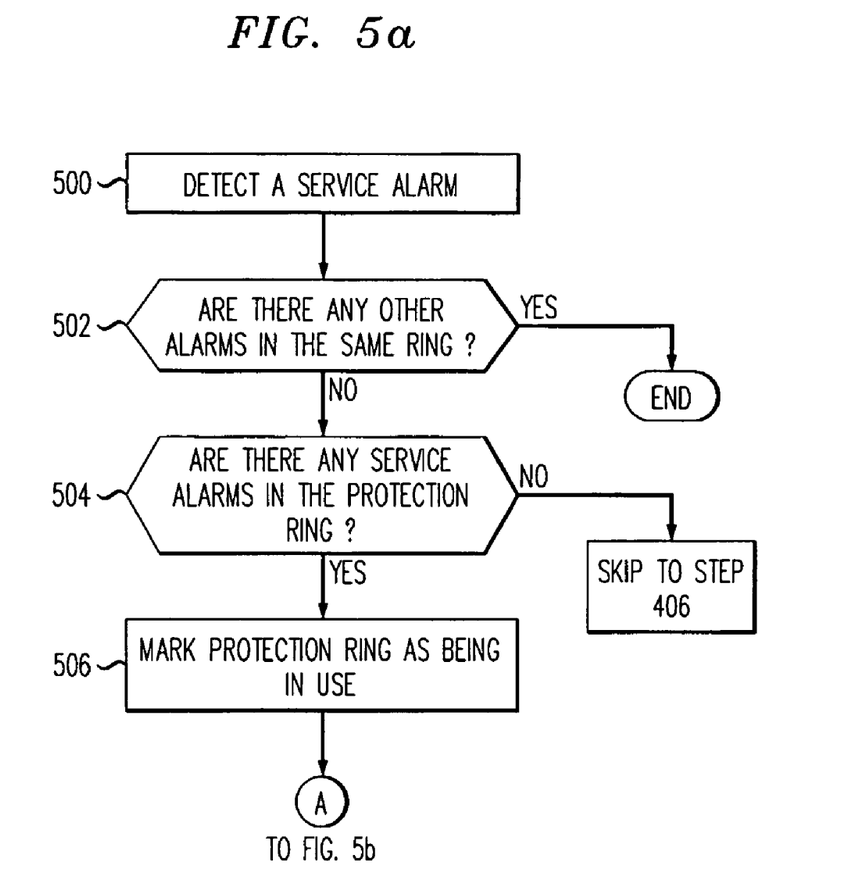
FIGS. 5(a)–(b) are flowcharts describing the operation of a second embodiment of the present invention, including how to redirect traffic.
Figure 5B:
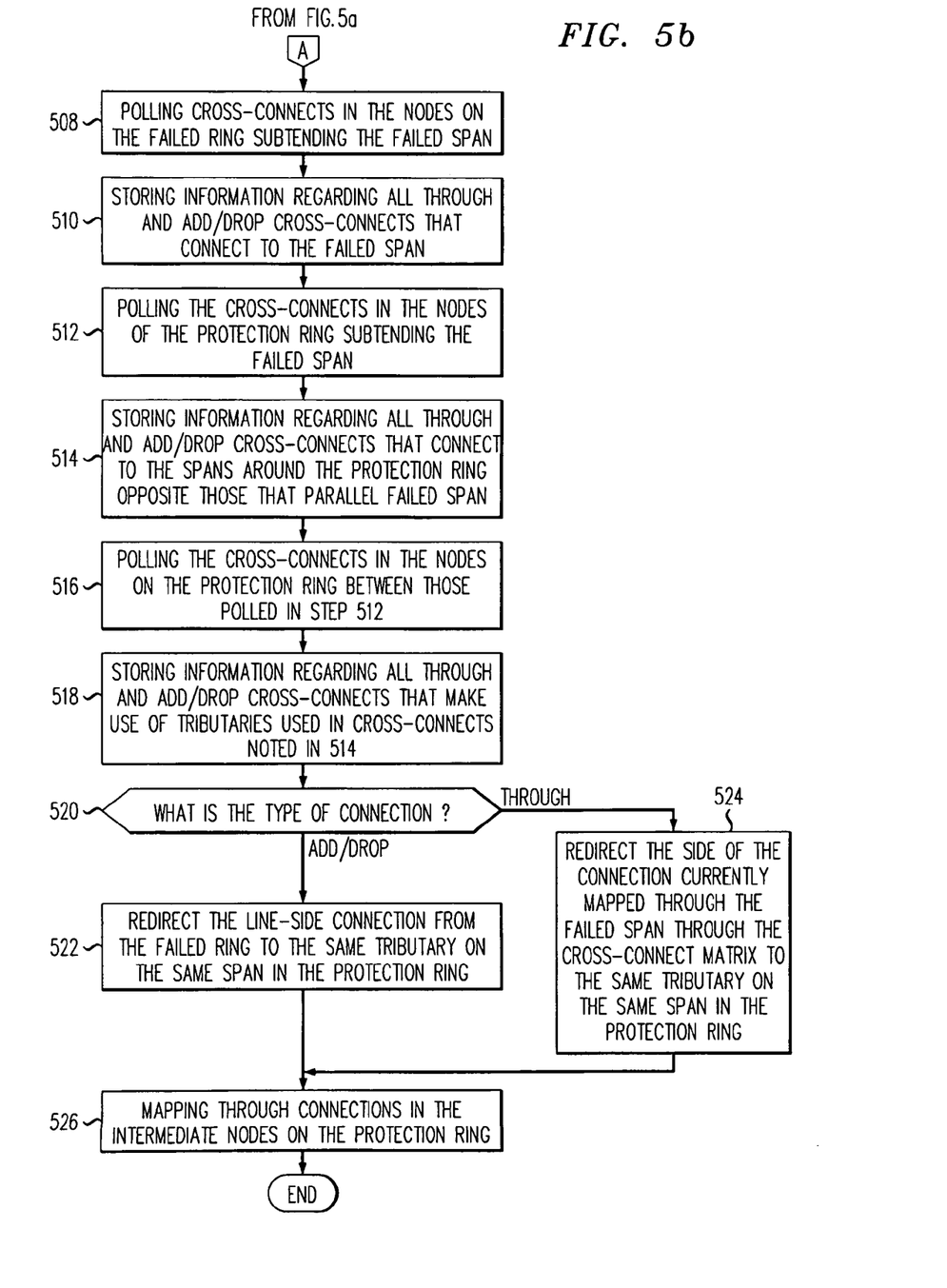

The implementation of this second embodiment of the invention is illustrated in FIGS. 5a–b. If a service-affecting line level alarm is detected in step 500, a search for other service-affecting line level alarms in the same ring is performed in step 502. If there are no service-affecting line level alarms on other spans in the same ring during a first time interval $t_{WAIT1}$, where $t_{WAIT1}$ is provisionable perhaps on a order of seconds, a search for service-affecting line level alarms on the protection ring is performed in step 504. If there are no service-affecting alarms on the protection ring during a time $t_{WAIT2}$, where $t_{WAIT2}$ is provisionable in the order of seconds, the system proceeds with a normal 1×N family reroute as described in the first embodiment of the invention and illustrated in FIGS. 4a–b. If, however, there is a single service-affecting line-level failure on the protection ring on the same span as the failure on the priority service ring, then the system proceeds with a special 1×N family reroute.

The protection ring is then marked as being in use in step 506 to prevent other rings from attempting to make us of the protection ring during subsequent failures. The cross-connects in the nodes on the failed ring subtending the failed span are polled in step 508. All through and add/drop cross-connects that connect to the failed span are then noted and stored in step 510. The cross-connects in the nodes on the protection ring subtending the spans or spans that parallel the failed span on the failed service ring are then polled in step 512. All protection ring through and add/drop cross-connects that connect to the spans around the protection ring opposite those that parallel the failed span on the failed service ring and make use of tributaries used in the cross connections noted in step 510 are noted in step 514. The cross-connects in the nodes on the protection ring between those polled in step 512 (again, on the side of the protection ring opposite those spans that parallel the failed span on the failed service ring) are then polled in step 516. All through and add/drop cross-connects that make use of tributaries used in the cross-connections noted in step 514 are then noted in step 518.

The system, in step 520, then sorts through the cross-connect list from the nodes on the failed ring gathered in step 510. For each add/drop connection, the line-side connection from the failed ring is then redirected to the same tributary on the same span in the protection ring, but in the opposite direction around the ring, in step 522 For each through connection, the side of the 10 connection currently mapped through the failed span is rerouted through the cross-connect matrix to the same tributary on the protection ring, but in the opposite direction around the ring, in step 524. For each tributary noted in step 514, through connections in the intermediate nodes, if any, are mapped onto the protection ring in step 526.

After the failures have been repaired and verified, the facilities are bridged and rolled from the protection ring back to the original cross-connect locations on the repair ring, using the table of original cross-connects stored in step 510 for the affected span prior to the restoration. Finally, the cross-connects on the protection ring are restored using the tables stored in steps 512 and 514.

It should be noted that, in the illustrated embodiments of the invention, failed facilities are routed to the same tributaries on the protection ring as on the failed ring to reduce the need for complex real time capacity searching. To minimize preemption, facilities can be provisioned on the service rings top down i.e., from the lowest tributary to the highest, and facilities on the protection ring could be provisioned bottom up, i.e., from the highest tributary to the lowest. However, the advantage of this approach will go down as maximum fill is reached on capacity of the SONET rings.

The foregoing merely illustrates the invention. It will thus be appreciated that those skilled in the art will be able to devise various arrangements which, although not explicitly described or shown herein, employ the principles of the invention and are thus within the spirit and scope of the invention.

What is claimed is:

1. A method for redirecting traffic in a SONET ring family comprising the steps of:
    assigning a second protection SONET ring to a SONET ring family comprising a first protection SONET ring, the first protection SONET ring distinct from the second protection SONET ring and connected to a first optical transport system line, the second protection SONET ring connected to a second optical transport system line;
    detecting a service alarm in at least one ring of the SONET ring family;
    directing traffic from the at least one ring in which a service alarm is detected onto the first protection SONET ring or the second protection SONET ring; and
    determining whether the second protection SONET ring is in use.

2. A method for redirecting traffic in a SONET ring family comprising the steps of:
    assigning a second protection SONET ring to a SONET ring family comprising a first protection SONET ring, the first protection SONET ring distinct from the second protection SONET ring and connected to a first optical transport system line, the second protection SONET ring connected to a second optical transport system line;
    detecting a service alarm in at least one ring of the SONET ring family;
    directing traffic from the at least one ring in which a service alarm is detected onto the first protection SONET ring or the second protection SONET ring; and
    marking the protection ring as being in use if no alarms in the protection ring are detected in the protection ring is not in use.

3. A method for redirecting traffic in a SONET ring family comprising the steps of:
    assigning a second protection SONET ring to a SONET ring family comprising a first protection SONET ring, the first protection SONET ring distinct from the second protection SONET ring and connected to a first optical transport system line, the second protection SONET ring connected to a second optical transport system line:
    detecting a service alarm associated with a subset of rings of the SONET ring family;
    directing traffic from a highest priority ring of said subset of rings to the second protection SONET ring; and
    determining whether the second protection SONET ring is in use.

4. A method for redirecting traffic in a SONET ring family comprising the steps of:
    assigning a second protection SONET ring to a SONET ring family comprising a first protection SONET ring, the first protection SONET ring distinct from the second protection SONET ring and connected to a first optical transport system line, the second protection SONET ring connected to a second optical transport system line;
    detecting a service alarm associated with a subset of rings of the SONET ring family;
    directing traffic from a highest priority ring of said subset of rings to the second protection SONET ring;
    marking second protection SONET ring as in use.

* * * * *